UNITED STATES PATENT OFFICE.

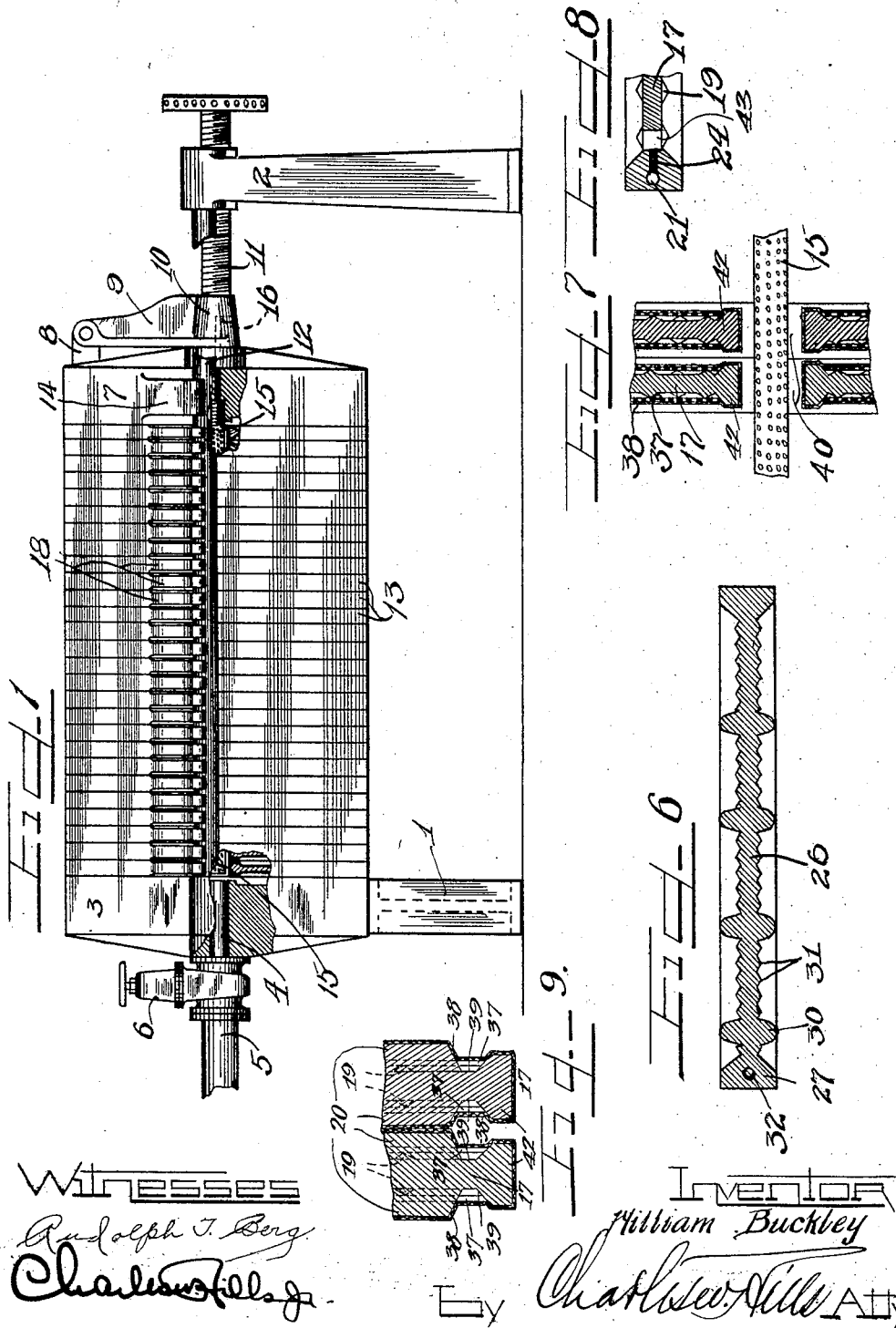

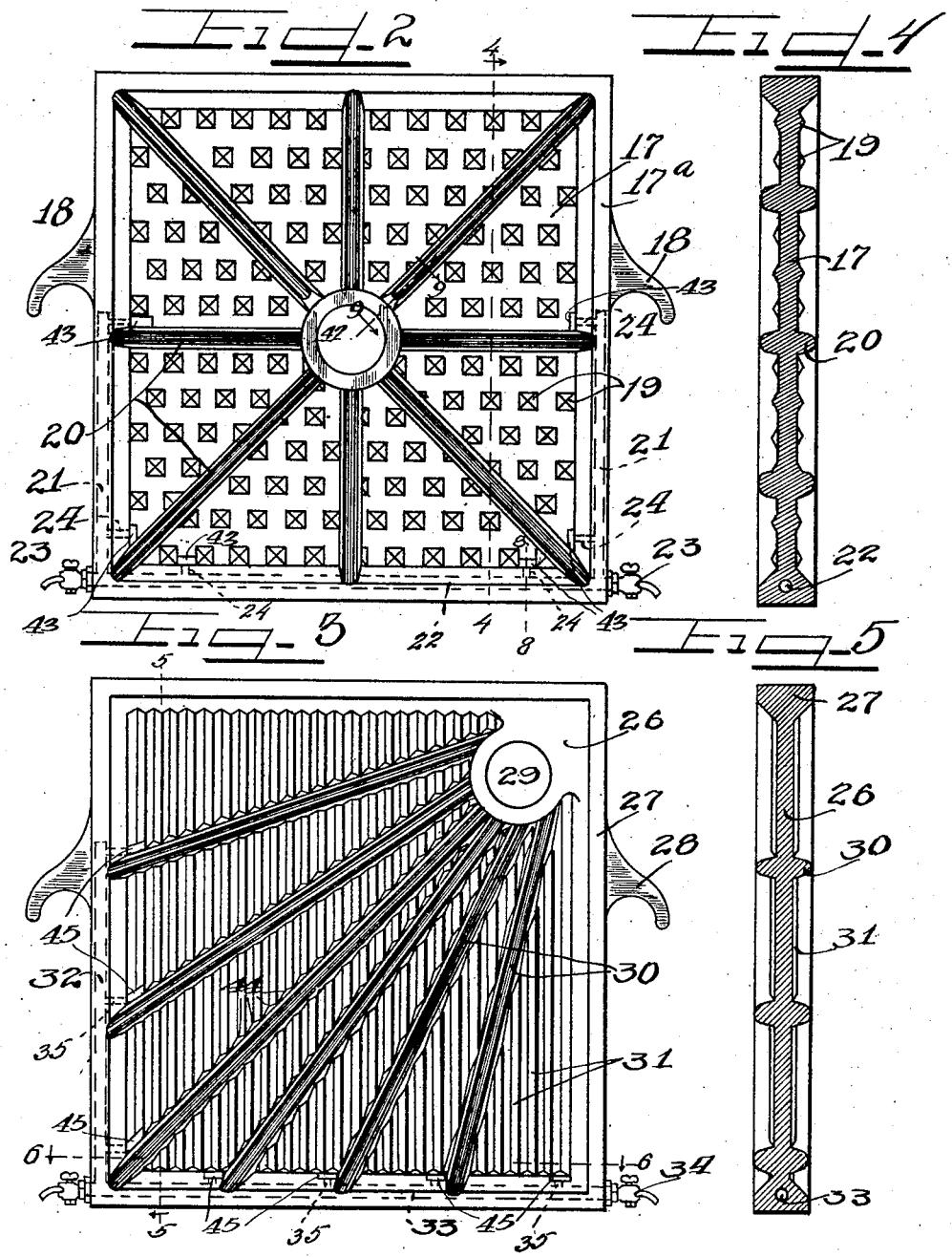

WILLIAM BUCKLEY, OF CHICAGO, ILLINOIS.

SLUDGE-PRESS PLATE.

1,316,418.   Specification of Letters Patent.   Patented Sept. 16, 1919.

Application filed October 15, 1917. Serial No. 196,614.

*To all whom it may concern:*

Be it known that I, WILLIAM BUCKLEY, a subject of the King of England, and a resident of the city of Chicago, in the county of Cook and State of Illinois, have invented certain new and useful Improvements in Sludge-Press Plates; and I do hereby declare that the following is a full, clear, and exact description of the same, reference being had to the accompanying drawings, and to the numerals of reference marked thereon, which form a part of this specification.

This invention relates to improvements in sludge press plates.

An objection to the plates heretofore in use is the uneven or imperfect drainage which results in a comparatively large area of soft sludge or material being left around the center of the cake of material which of course prevents a solid cake of material being formed with the result that this soft sloppy center of the cakes gives way or breaks off in taking them from the press causing much inconvenience and loss or necessitates further treatment of this soft material.

It is an object of this invention to construct a plate for sludge presses by use of which uniformly hard cakes may be obtained and which obviates the objections of the soft centers.

It is further an object of this invention to provide a device in which plates are provided with draining passages arranged in the walls thereof by means of which the fluid may be thoroughly drained from the solids.

It is further an object of this invention to provide a sludge press plate which is adapted to form a plurality of cakes of a size to be readily handled and to separate the same, thereby preventing a large sloppy or slushy center being formed in the cake.

It is also an object of this invention to provide in a sludge press peripherally drained plates and center draining means for the material thereby providing draining means around the outer edge and centrally of the cakes to be formed.

The invention (in a preferred form) is illustrated in the drawings and hereinafter more fully described.

On the drawings:

Figure 1 is a view of a sludge press with parts broken away.

Fig. 2 is a view of one of the sludge plates embodying my invention.

Fig. 3 is a view of a modified form of sludge plate.

Fig. 4 is a section taken on the line 4—4 of Fig. 2.

Fig. 5 is a section taken on the line 5—5 of Fig. 3.

Fig. 6 is a section taken through the sludge plate shown in Fig. 3 on the line 6—6 at right angles to the view shown in Fig. 5.

Fig. 7 illustrates a fragmentary sectional detail of plates assembled for filtering and shows the central drain pipe.

Fig. 8 is an enlarged fragmentary detail taken through the periphery or rim of one of the plates on the line 8—8 of Fig. 3 showing the drain passage and communicating ports.

Fig. 9 is an enlarged fragmentary sectional view on the line 9—9 of Fig. 2, showing portions of adjoining plates and the parts assembled thereon for filtering and illustrates the drainage passageways from the upper sections of the plates to the side sections thereof.

As shown on the drawings:

The sludge press comprises the spaced standards 1 and 2, the former of which has a head 3, which is connected with the standard 2 by means of a pair of parallel side rods or rails 12. These rails are adapted to support the filter plates 13, and head 7, which have hooks 18 and 14, respectively, at each side thereof to engage over the rails 12, and thereby support the plates 13 and 7, to slide thereon.

Secured to the head 7, is an arm 8, from which depends a hanger 9, having a boss 10, against which the inner end of the screw shaft 11, abuts for clamping the filter plates 13 between the heads 3 and 7, said screw shaft being threaded in a bearing provided therefor in the standard 2, and having a hand wheel or other means at the outer end for turning the screw shaft.

The filter plate shown in Figs. 2 and 4, comprises a comparatively thin plate 17, having a surrounding rim 17$^a$, and a hook 18, at each side thereof, and there is a central aperture 40, in each plate with a flange or rim 42, extending therearound at each side of the plate, which said flange extends a less distance above the surface of the plate 17 than the marginal rim 17ª, so that when the plates are assembled side by side with the marginal flanges or rims 17ª, abutting the flanges 42, of adjoining plates are separated sufficiently to admit material from the openings 40 in between the plates 17. Integral with the plate at each side thereof are projections or bosses 19, which extend only a slight amount above the surface of the plate and serve to engage and hold perforated strainer plates 37, away from the surface of the plate 17, to provide a drainage space therebetween, and there are also a plurality of ribs 20, extending between the plates 37, and radially from the central opening 40, to the rim 17ª, and extending above the surface of the plate 17, the same distance as the rim 17ª, so that when the plates are placed together the corresponding ribs on the adjoining plates fit together and divide the space between the plates into a plurality of separate compartments. The inner ends of these ribs 20, do not come together but there is a space between the inner ends of adjoining ribs, and owing to the fact that the central hub or rim 42, extends a less distance above the plate 17 than the ribs 20, there is a flat passageway or opening from the central opening 40, between the ribs 20, of adjoining plates to the compartment between each adjoining pair of ribs 20, so that material may be supplied from said central opening to each compartment.

Cored or otherwise formed in the rim along each lateral edge of the plate from a point above the horizontal ribs are passages 21, which communicate with a similar passage 22, along the bottom edge of the plate, and drain cocks 23, are connected with and afford an outlet from each end of the passage 22. Openings 43, extend from side to side of the plate and are connected by means of the ports 24, with the passages 21 and 22, and afford direct drainage outlets from all the compartments except the upper two at each side of the plate. For draining the upper compartments the diagonal ribs 20, at the outer sides of these compartments are provided at their inner ends with notches 39, the bottoms of which are flush with the face of the plate and below the perforated plates 37, with which each of the compartments is provided. These plates rest against the projections 19 and are spaced thereby from the surface of the plate and the notches 39, provide communication for liquid from the drainage space under the perforated plate in the upper compartment to the corresponding space in the adjoining compartment directly below from whence it is discharged through the port 24, leading from the latter drainage space.

A filter cloth 38, is laid over each face of the plate 17, after the perforated plates 37 have been placed thereon and the edges of the cloth extend over the marginal rim 17ª, so that when the plates are placed side by side in the press and clamped together the cloths are clamped and held therebetween. These cloths are centrally perforated and the edges of the cloths on opposite sides of the plates around the perforations are brought together in the opening 40, of the plate and fastened so that the faces of each plate are thoroughly covered by the cloth and no material can reach the drainage spaces between the plates 17 and strainer plates 37, thereon except by passing through the cloth.

To facilitate drainage of liquid from the material to be treated there is a pipe 15, which is mounted on the head 7, and extends through the central openings 40, in the plates 17, to a point adjacent the head 3, when the press is assembled and the diameter of this pipe is less than the diameter of the openings 40, so as to afford sufficient space between the pipe and the walls of the openings 40, for passage of material to the filter spaces between the plates. The outer end of this pipe is closed and the wall of the pipe perforated and covered with a filter cloth 41, and there is an outlet 16, through the head 7, from the interior of the pipe, so that as the material is forced into the press through the openings 40, a large percentage of the liquid in the material is drained off through the pipe 15 before the material is pressed into the compartments between the plates 17.

In the construction shown in Figs. 3, 5 and 6, the plate 26, is provided with a rim 27, and hooks 18. In this plate the opening 29, is in one of the upper corners of the plate and the ribs 30, radiate downwardly from the opening 29 across the face of the plate and each is inclined so that liquid can flow there along to the drain passages. The plate is provided with ribs 31, which are notched at their lower ends as at 44, so as to afford drainage communication between the channels formed between the ribs and drain passages 32—33, are cored in the rim 27, from which open drain cocks 34. Passages 35, open through the rim 27, as before described.

Perforated plates similar to the plates 37, of the construction before described are provided to fit between the ribs 30, and rest against the smaller ribs 31, and in using the plate it is covered with a fabric in a manner similar to the plate 17.

The operation is as follows:

The filter plates have the perforated plates 37, placed thereon and then the fabric laid on each side thereof and connected through the opening in the plate as above described, after which the plates are assembled in the press and clamped together so that the fabric coverings are clamped between the marginal rims of adjoining plates. The supply valve 6, is then opened and the material forced into the press through the matching openings in the plates and as it flows through said openings, some of the liquid is drained therefrom through the pipe 15. The material is then forced between the fabric coverings of adjoining plates into the compartments into which the space between the adjoining plates is divided by the radial ribs thereon, and as it is forced therein the remainder of the liquid is drained therefrom through the fabric coverings and perforated plates 37, and into the space between the perforated plates and the filter plate and from this space is drawn off through the openings 43, ports 24 and passages 21 and 22, in the structure shown in Figs. 2 and 4, and through the corresponding openings 45, ports 35 and passages 32 and 33, in the structure of Figs. 3, 5, and 6.

After the material has the liquid thoroughly extracted therefrom the valve 6 is closed, and the press opened up and the small cakes of thoroughly drained material are removed therefrom. The filter cloths 38, and perforated plates 37, need not be removed after each operation but only when it becomes necessary on account of damage or wear to the cloths or for cleaning.

The pipe 15 is used to provide a more rapid extraction of the liquid from the material treated and may be omitted in some cases, and particularly when the plates shown in Figs. 3, 5 and 6 are used, as the arrangement of the inlet openings through the plates and the downward slope of the ribs radiating therefrom enables a rapid drainage to take place without the use of the pipe 15.

By the construction disclosed each cake is formed independently of the others and a large soft central sloppy or slushy portion is not formed, on the contrary the cakes are uniformly compact and can be readily handled.

Many changes may be made and details may be varied through a wide range without departing from the principles of my invention, and I therefore do not desire to limit the patent, when issued, otherwise than necessitated by the prior art.

I claim as my invention:

1. A filter press plate having a suitable formation on the surface thereof to provide channels for draining filtered material, a rim extending around the surface of the plate to confine the filtered material on the plate, ribs for dividing the surface of the plate into separate compartments, and means for providing an outlet from each of said compartments.

2. A filter press plate having a flange extending around and projecting above the surface of the plate to confine the filtered material, ribs projecting a corresponding distance above the surface of the plate for dividing the surface of the plate into separate compartments, and means for providing a drainage outlet for each compartment.

3. A filter press plate having raised portions on the surface thereof to form channels for draining the filtered material, ribs on the surface of the plate extending above the said raised portions thereon, for dividing the surface of the plate into separate compartments, and means for providing a drainage outlet for each compartment.

4. A filter press plate having an opening therethrough for supplying material to be filtered to each side of the filter plate, and ribs on the surface of the said plate for dividing the surface of the said plate into a plurality of separate compartments communicating with the said opening.

5. A filter press plate having an opening therethrough for supplying material to be filtered to each side of the filter plate, a rim extending around the filter plate, and ribs extending radially from the said opening to the rim for dividing the filter plate into a plurality of separate compartments, raised portions on the surface of the plate intermediate of the said ribs to provide channels for draining the filtered material, and means for providing a drainage outlet from each compartment.

6. A filter press plate having a marginal rim and ribs on the surface of the plate dividing the surface of the plate into separate compartments, and a plurality of draining means communicating with each compartment.

7. A filter press plate having a marginal rim for confining filtered material on the surface of the plate, and a tubular duct at the side and bottom of the filter plate, ribs on the surface of the filter plate for dividing the surface of the plate into a plurality of separate compartments, and means for providing an outlet duct from each compartment to the said tubular duct.

8. In a filter press, the combination of a plurality of plates having matching marginal rims and flanges on the surface of the plates for dividing the space intermediate of the plates into separate compartments, and means for providing a drainage outlet from each compartment.

9. In a filter press, the combination of a plurality of plates provided with matching rims for spacing the plates and confining the material to be filtered on the plates, matching openings in the plates for supplying material to be filtered to each side of the plate, matching radial flanges on the said plates for dividing the space intermediate of the plates into separate compartments communicating with the matching openings of the said plates, and means for providing a drainage outlet from each of the said compartments.

10. In a filter press, the combination of a plurality of plates having matching openings therethrough, and matching rims for providing a space intermediate of the plates and confining the material to be filtered therein, means for supplying material to be filtered through the matching openings in said plates, and a pervious tubular member extending through the said openings in the said plates and provided with a drainage outlet.

11. In a filter press, the combination of a series of plates having matching openings therein, means for spacing the plates and confining material to be filtered in the space between the said plates, means for supplying material to be filtered to the space intermediate of the plates, and means communicating with the said matching openings in the said plates for draining the material between the said plates.

12. In a filter press, the combination of a series of plates having matching openings therein, means interposed between the said plates for spacing the plates and confining material to be filtered in the space between the said plates, a pervious tubular member extending loosely through the said matching openings in the said plates, and provided at one end of the series of plates with a drainage outlet and at the other end with closing means to prevent entrance of material to be filtered to the interior of the tubular member, and means at one end of the series of filter plates for supplying material to be filtered to the said matching openings through the said plates.

13. In a filter press, the combination of a series of plates, means interposed between the plates for spacing the plates and confining the material to be filtered therein, matching openings in the said plates, matching ribs on the surface of the plates for dividing the space intermediate of the plates into separate compartments communicating with the openings, means for providing a drainage outlet from each compartment, and means communicating with the matching openings for supplying material to be filtered to the said compartments.

In testimony whereof I have hereunto subscribed my name in the presence of two subscribing witnesses.

WILLIAM BUCKLEY.

Witnesses:
  FRED E. PAESLER,
  LAWRENCE REIBSTEIN.

Copies of this patent may be obtained for five cents each, by addressing the "Commissioner of Patents, Washington, D. C."